2 Sheets—Sheet 1.

W. WHITNEY.

WATER-WHEEL.

No. 7,066. Reissued April 18, 1876.

Witnesses

N. Evans Jr.

R. J. Steele

Inventor

Walter Whitney

N. PETERS, PHOTO-LITHOGRAPHER, WASHINGTON, D. C.

2 Sheets—Sheet 2.

W. WHITNEY.

WATER-WHEEL.

No. 7,066. Reissued April 18, 1876.

Witnesses

H. Gross

R. J. Steele

Inventor

Waldo Whitney

N. PETERS, PHOTO-LITHOGRAPHER, WASHINGTON, D. C.

UNITED STATES PATENT OFFICE.

WALDO WHITNEY, OF LEOMINSTER, MASSACHUSETTS.

IMPROVEMENT IN WATER-WHEELS.

Specification forming part of Letters Patent No. 42,708, dated May 10, 1864; reissue No. 7,066, dated April 18, 1876; application filed March 3, 1876.

*To all whom it may concern:*

Be it known that I, WALDO WHITNEY, now of Leominster, (formerly of Manchester, New Hampshire,) county of Worcester, State of Massachusetts, have invented certain new and useful Improvements in Water-Wheels, of which the following is a specification:

The nature of my invention consists, first, in the combination, in a water-wheel, of an inverted conical disk with a peculiar-shaped bucket or float; second, in a concave disk or basin around the wheel, provided with guides or chutes to direct the water tangentially against the wheel; third, in combination with a water-wheel of this class, a cylindrical gate arranged to open and close the chutes or apertures that supply the wheel with water.

Figure 1:
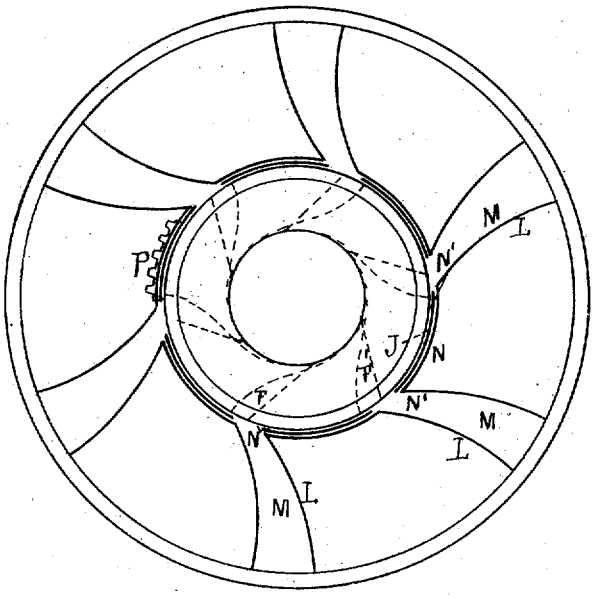
Figure 2:
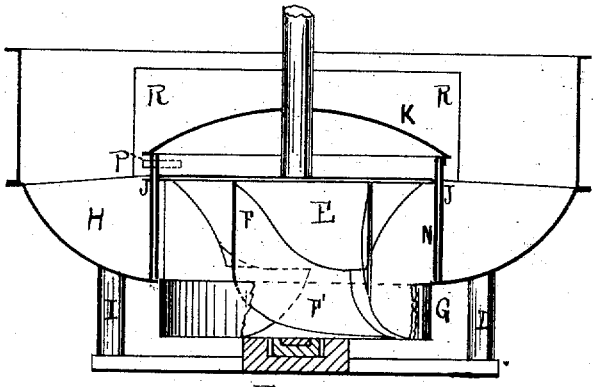
Figure 3:
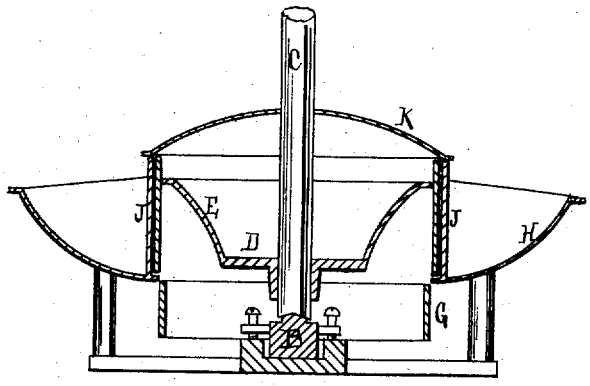
Figure 4:
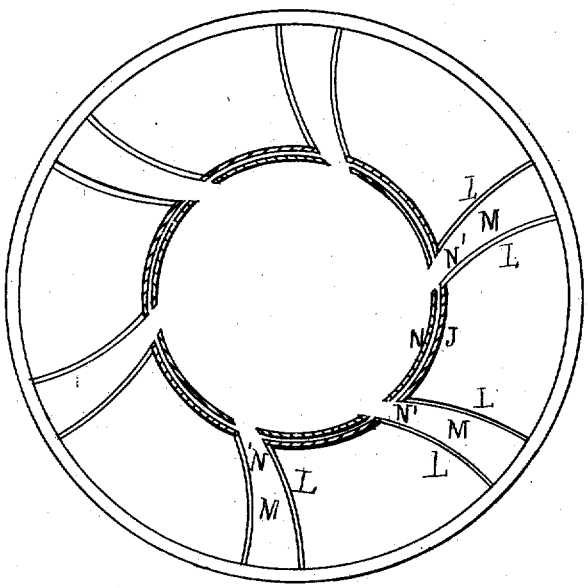

Figure 1 is a plan showing the wheel and case, the outlines of the bucket being represented by dotted lines. Fig. 2 shows the case of the wheel in vertical section, and the wheel itself in elevation. Fig. 3 is a vertical section through the curb and wheel. Fig. 4 is a plan showing the chutes or water-ways, and one method of arranging the cylindrical gate.

The wheel proper consists of a disk, D E, Figs. 2 and 3, made in the form of an inverted truncated cone, hung to a central shaft, C, and supported by the step B. To the disk D E I attach, by any suitable means, a series of buckets, F F′, Figs. 1 and 2. The upper part F of these buckets is vertical, the outer part being nearly radial, while the inner part joins the lower part of the cone E tangentially. The lower part F′ of the bucket joins at its outer edge the ring or hoop G, Figs. 2 and 3, and sweeps from the perpendicular part F around until its lower portion is almost horizontal. The lower edge of one bucket or float extends under and beyond the vertical parts of the next bucket. As the outer edge of the lower part of each bucket is joined to the hoop G, (see Figs. 2 and 3,) it is evident that the water will be discharged tangentially and nearly horizontal, thus giving the wheel the full benefit of the reaction, and as the water from the chutes first strikes the vertical parts of the bucket, it is evident that I get the full direct force. H is a concave disk or basin surrounding the wheel, and supported by standards L L. This disk H has an opening in the center just large enough for the hoop G of the wheel to turn freely in, the top of the hoop G being even with the bottom of the basin H. (See Fig. 3.) J is a cylindrical curb placed within the basin or case H, and surrounding the wheel, as shown at Fig. 3, and is provided with openings or gateways N′ N′ N′, Figs. 1 and 4, through which the chutes M M M discharge. This curb J is covered by the cap K, Figs. 2 and 3. N is a cylindrical gate, provided with openings at N′, corresponding with the openings in J, already described. This cylindrical gate is provided with a segment of a gear, P, Fig. 1, by which it may be revolved sufficiently to open or close the gateways.

I claim as my invention—

1. In combination with the peculiarly-shaped floats F, the inverted conical center E and hoop G, to which the floats are fastened, substantially as described, and for the purpose set forth.

2. In combination with the concave disk or basin around the wheel, the stationary guides L and chutes M, to direct the water onto the wheel, substantially as described.

3. In combination with a water-wheel of this class, a cylindrical gate fitted to traverse or revolve, so as to open and close the gate-apertures which supply water to the wheel, substantially as described, and for the purpose set forth.

WALDO WHITNEY.

Witnesses:
J. GRANT,
N. EVANS, Jr.